United States Patent

Ohba et al.

[11] Patent Number: 6,127,993
[45] Date of Patent: Oct. 3, 2000

[54] METHOD AND APPARATUS FOR DRIVING DISPLAY DEVICE

[75] Inventors: Toshihiro Ohba; Atsushi Sakamoto, both of Nara; Yoshiyuki Kokuhata, Yamatokoriyama; Hiroshi Kishishita, Nara; Hisashi Uede, Wakayama, all of Japan

[73] Assignee: Sharp Kabushiki Kaisha, Osaka, Japan

[21] Appl. No.: 07/860,254

[22] Filed: Mar. 31, 1992

Related U.S. Application Data

[63] Continuation of application No. 07/443,391, Nov. 30, 1989, abandoned.

[30] Foreign Application Priority Data

Nov. 30, 1988 [JP] Japan .................................. 63-304956

[51] Int. Cl.[7] .................................................... G09G 3/30
[52] U.S. Cl. .............................................. 345/77; 345/79
[58] Field of Search ..................................... 340/781, 784, 340/793, 805; 315/169.3, 164.2

[56] References Cited

U.S. PATENT DOCUMENTS

| | | | |
|---|---|---|---|
| 3,975,661 | 8/1976 | Kanatani et al. | 340/781 |
| 4,488,150 | 12/1984 | Kanatani | 340/781 |
| 4,594,589 | 6/1986 | Ohba et al. | 340/805 |
| 4,733,228 | 3/1988 | Flegal | 340/805 |
| 4,742,346 | 5/1988 | Gillette et al. | 340/793 |
| 4,743,096 | 5/1988 | Wakai et al. | 340/784 |
| 4,951,041 | 8/1990 | Inada et al. | 340/781 |

FOREIGN PATENT DOCUMENTS

| | | |
|---|---|---|
| 0051521 | 10/1981 | European Pat. Off. . |
| 0201369 | 3/1986 | European Pat. Off. . |
| 2505072 | 5/1982 | France . |
| 54-50289 | 4/1979 | Japan . |
| 54-67330 | 5/1979 | Japan . |
| 2177831 | 7/1986 | United Kingdom . |
| 2186414 | 2/1987 | United Kingdom . |

OTHER PUBLICATIONS

HV01, 16–Channel Matrix TFEL Panel Display Column Driver, Supertex inc., Databook 1988–1989, 1988. pp. 11–3 to 11–8.

Flegal et al., Differential Aging Effects in ACTFEL Displays, SID 86 Digest, 1986, pp. 177–180.

Electronics, Prolong the Life of Thin–Film EL Flat Panels, Oct. 2, 1986, pp. 84–87.

*Primary Examiner*—Steven J. Saras

[57] ABSTRACT

In a display device such as a thin-film EL display device, etc. formed with a dielectric layer disposed between a plurality of scanning side electrodes and a plurality of data side electrodes in the direction for them intersecting to each other, a modulation voltage, varied according to gradation display data is applied to the data side electrodes, and a positive or negative writing voltage is applied to the scanning side electrodes in a line order for a gradation display different in brightness. Binary coded signals corresponding to each gradation of a gradation display are used as the gradation display data. The logical value of the binary coded signal is inverted according to the polarity of the writing voltage. Thus, a common gradation display can be performed from one binary coded signal for both the negative driving that applies a negative writing voltage and the positive driving that applies a positive writing voltage. As a result, by only by adding a data conversion circuit for inverting a binary coded signal, the function that converts the correspondence relation between the gradation to be displayed and the gradation display data depending on the negative driving or positive driving can be incorporated.

9 Claims, 4 Drawing Sheets

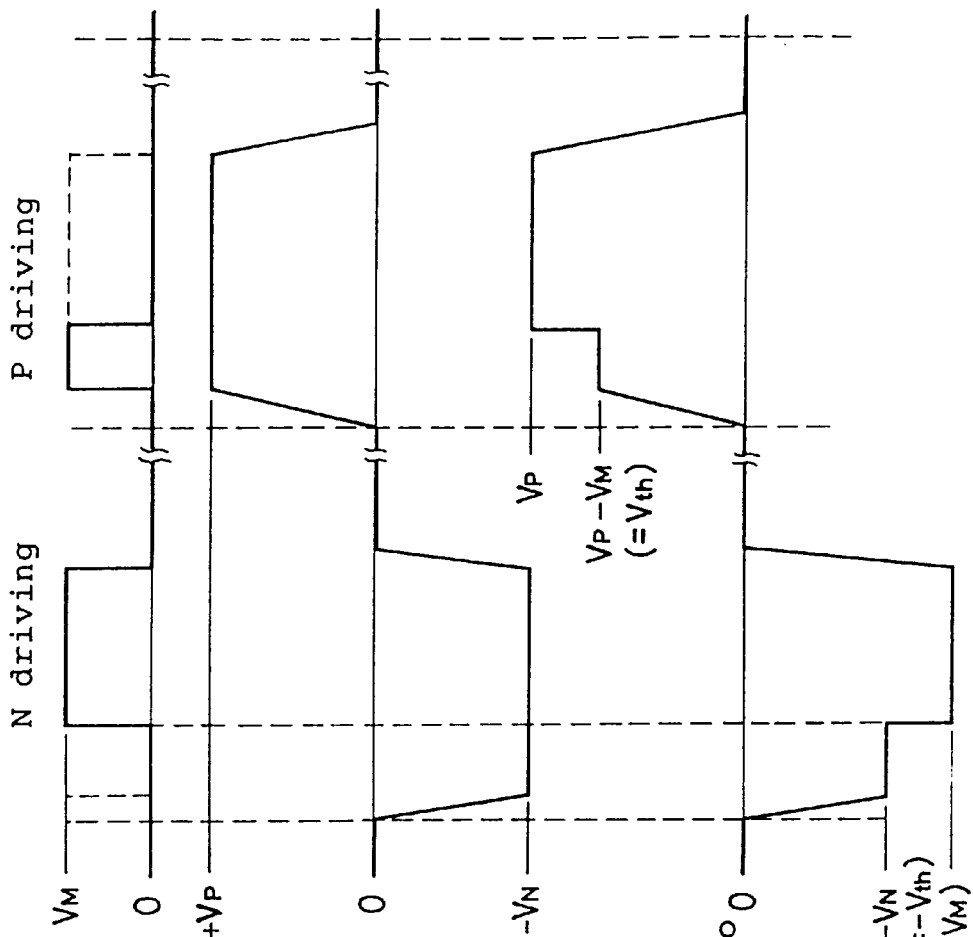
Fig. 6(1) Modulation voltage
Fig. 6(2) Writing voltage
Fig. 6(3) Voltage applied to picture element

METHOD AND APPARATUS FOR DRIVING DISPLAY DEVICE

This application is a continuation of application Ser. No. 07/443,391 filed on Nov. 11, 1989 now abandoned.

BACKGROUND OF THE INVENTION

1. Field of the Invention

The present invention relates to a method and an apparatus for driving a display device such as an ac driven capacitive flat matrix display panel (hereinafter referred to as thin film EL display device), etc.

2. Description of the Prior Art

For example, a double insulation type (or three-layer structure) thin film EL element is formed in the following way.

As shown in FIG. 1, band-like transparent electrodes 2 are disposed in parallel to each other on a glass substrate 1. On this, a dielectric material 3a such as $Y_2O_3$, $Si_3N_4$, $Al_2O_3$, etc., an EL material 4 composed of ZnS to which an active agent such as Mn, etc. is doped, and a dielectric material 3b such as $Y_2O_3$, $Si_3N_4$, $TiO_3$, $Al_2O_3$, etc. likewise as above, are laminated in turn to a film thickness of 500–10000 Å by using a thin-film technique such as vacuum deposition or sputtering to make a three-layer structure. On this structure, band-like back electrodes 5 composed of Al (aluminum) are disposed in parallel to each other at direction of right angles to the transparent electrode 2.

In the thin film EL element, the EL material 4, sandwiched by dielectric materials 3a, 3b, is disposed between the electrodes. Thus, it can be regarded as a capacitive element in terms of an equivalent circuit. As is apparent from the voltage - brightness characteristics shown in FIG. 2, this thin-film EL element is driven by applying a relatively high voltage of about 200 V. This thin-film EL element has characteristics that it emits highly bright light by an ac field, and yet its service life is long.

In such a display device using a thin-film EL element as a display panel, the following method (so-called symmetrical driving method) is generally used as a suitable method for keeping the display quality of a thin-film EL element which is ac driven. One of either the transparent electrode 2 or the back electrode 5 is made to serve as a data side electrode, and the other is made to serve as a scanning side electrode. A gradation voltage is applied to the data side electrode according to gradation display data on the one hand. A writing voltage is applied to the scanning side electrode in the order of line. Further, the writing voltage completes a display of one frame in a first field that serves as one of the polarities to the data side electrode and a second field that serves as the other electrode.

This driving method causes a superimposing or offset effect of the writing voltage and a modulation voltage to occur at each picture element corresponding to an intersecting position of the data side electrode and the scanning side electrode among the above EL layers 4. The voltage substantially applied to the picture elements becomes more than a light emission threshold voltage or a value less than a light emission threshold voltage. This causes each picture element to show a state of light emission or non-light emission, and a predetermined display is obtained.

In such a display device, when the brightness of each picture element is displayed in a gradation display of several steps, a pulse width modulation method by which the pulse width of a modulation voltage applied to a data side electrode is changed according to gradation display data, or an amplitude modulation method by which the amplitude of a modulation voltage is changed according to gradation display data, is adopted.

In the case of gradation display by a pulse width modulation method, for example, in a field of N driving, a modulation voltage of the pulse width corresponding to the gradation to be displayed to the data side electrode, and a voltage of a waveform to which the amplitude of a modulation voltage is superimposed into the absolute value of the amplitude of a writing voltage, is applied to a picture element. Hence, the section corresponding to the pulse width of a modulation voltage is one that exceeds a light emission threshold voltage. That is, the area of a voltage (intensity) applied to a picture element increases as the pulse width of a modulation voltage becomes longer, and decreases as it becomes shorter. On the other hand, in a field of positive driving in which a writing voltage of positive polarity is applied to the scanning side electrode, a modulation voltage of a pulse width opposite to the gradation to be displayed (short pulse width for a highly bright gradation, long pulse width for a low bright gradation) is applied to the data side electrode, and a voltage of the waveform in which the amplitude of the writing voltage is subtracted by the amplitude of a modulation voltage, is applied to a picture element. Therefore, the section that the pulse width of the writing voltage is subtracted by the pulse width of a modulation voltage, is one that exceeds a light emission threshold voltage. That is, the area of a voltage (intensity) applied to a picture element decreases as the pulse width of a modulation voltage becomes longer, and increases as it becomes shorter.

As described above, with symmetrical driving such that display of one frame is completed by a field of negative driving and a field of positive driving, when gradation display is made, the relation of a pulse width of a modulation voltage must be inverted for the negative driving and the positive driving even if it is of the same gradation. In other words, gradation display data must be set opposite in the cases of negative driving and positive driving. This also applies to the case of an amplitude modulation method for a modulation voltage.

However, incorporating the function that converts the relation of the gradation to be displayed and gradation display data according to negative driving and positive driving as described above to peripheral circuits and peripheral devices of a display device, nullifies the wide use of those peripheral circuits and peripheral devices. So, the conversion function has generally been shared by a driving circuit that directly applies a modulation voltage to the data side electrode. Therefore, a problem of the a driving circuit being complicated has existed.

SUMMARY OF THE INVENTION

An objective of the present invention is to provide a method and apparatus for driving a display device capable of having a function that converts a corresponding relation between gradation to be displayed and gradation display data, depending on whether it is negative driving or positive driving, without destroying the wide use of peripheral circuits and peripheral devices or complicating a driving circuit.

The invention provides a method for driving a display device formed by interposing a dielectric layer between a plurality of scanning side electrodes and a plurality of data side electrodes, characterized in that a positive writing voltage is applied to each of scanning side electrodes in one of a pair of fields, a negative voltage is applied in the other of a pair of fields, a modulation voltage is applied to each of the data side electrodes for the duration corresponding to the logical value of a binary code of a plurality of bits predetermined in one field, and a modulation voltage is applied for the duration corresponding to the logical value of a code obtained by inverting the above binary code in the other field.

The invention provides a method for driving a display device in which a dielectric layer is interposed between a plurality of scanning side electrodes and a plurality of data side electrodes arranged in perpendicular intersecting directions. A modulation voltage in which a pulse width or amplitude is varied according to the gradation display data, and is applied to the data side electrodes. Further, a positive or negative writing voltage is applied in a line sequential order to the scanning side electrodes to cause the picture element made of the above dielectric layer to perform a gradation display that is different in brightness in several steps. The method is characterized in that the binary coded signals corresponding to each gradation of the gradation display are used as the gradation display data. Further, the binary coded signals are inverted so that common gradation display is made possible for a single gradation display data on the basis of the logical value of the binary coded signal, regardless of whether the writing voltage is negative or positive.

According to the invention, binary coded signals corresponding to each gradation of gradation display are used as gradation display data. The logical value of the binary coded signal is applied, as is, in the case of, for example, negative driving in which the writing voltage is negative. Further, in the case of positive driving in which the writing voltage is positive, the binary coded signals are inverted. As a result, the relation of gradation display data to gradation is reverse for the cases of negative driving and positive driving. Therefore, gradation display common to one binary coded signal is performed in both the negative and positive driving.

As described above, according to the invention, gradation display common to both the negative and positive driving can be performed for one binary coded signal by using binary coded signals corresponding to each gradation of the gradation display as gradation display data to invert the logical value of the binary coded signals according to the polarity of the writing voltages. Therefore, a function that converts the corresponding relationship between gradation to be display and display data, depending on negative driving or positive driving, can be incorporated by adding a simple circuit. This is added without destroying the wide use of peripheral circuits or peripheral devices, or complicating a driving circuit.

Further, the invention provides a driving apparatus for a display device, including: a display device formed by interposing a dielectric layer between a plurality of scanning electrodes and a plurality of data electrodes; a scanning electrode circuit for applying a positive writing voltage in one field of a pair of fields, and for applying a negative writing voltage in the other field to each scanning electrode, and a data electrode driving circuit for applying a modulation voltage for the duration corresponding to the logical value of a binary code of a plurality of predetermined bits in one field, and for applying a modulation voltage for the duration corresponding to the logical value of a code obtained by inverting the binary code in the other field.

Still further, the invention provides a driving apparatus for a display device, including: the data conversion circuit for outputting binary coded data representing a gradation as it is in one of the fields and for inverting and outputting it in the other field in correspondence to each data electrode for each scanning section; a counter for performing pulse counting operation for each scanning section for each scanning electrode; a comparator for comparing the binary coded data representing the gradation with the counting value output by the counter and for determining the duration of a modulation voltage to be applied; and a driving device for forming a modulation voltage waveform in response to the output of the comparator and providing it to the data electrodes.

Still more further, the invention provides a driving apparatus for a display device, characterized in that a modulation voltage such that it is superimposed to a predetermined display threshold voltage within the range of gradation changes depending on a voltage for 100% lighting or 0% lighting, is provided to the data electrodes.

The invention provides a method for driving a display device, including: a display device formed by interposing a dielectric layer between a plurality of scanning side electrodes and a plurality of data side electrodes, characterized in that a positive writing voltage and a negative writing voltage are alternately applied to the scanning side electrodes adjacent in one field; a modulation voltage is applied for the duration corresponding to the logical value of a binary code of a plurality of predetermined bits in the term corresponding to one electrode of the adjacent scanning side electrodes, and a modulation voltage is applied for the duration corresponding to the logical value of a code obtained by inverting the binary code in the term corresponding to other electrode of the adjacent scanning side electrodes to the data side electrodes.

The invention further provides a driving apparatus for a display device, comprising: a display device formed by interposing a dielectric layer between a plurality of scanning side electrodes and a plurality of data side electrodes;
 a scanning electrode driving circuit for alternately applying a positive writing voltage and a negative writing voltage to the scanning side electrode adjacent in one field; and
 a data electrode driving circuit for applying a modulation voltage for the duration corresponding to the logical value of a binary code of a plurality of predetermined bits in the term corresponding to one electrode of the adjacent scanning side electrode and applying a modulation voltage for the duration corresponding to the logical value of a code obtained by inverting the binary code in the term corresponding to other electrode of the adjacent scanning side electrodes to the data side electrodes.

The invention provides a method for driving a display device, including: a display device formed by interposing a dielectric layer between a plurality of scanning side electrodes and a plurality of data side electrodes, characterized in that positive writing voltage and negative writing voltage are alternately applied to the scanning side electrode adjacent in one field of two fields which form a pair, and negative writing voltage and positive writing voltage are alternately applied to the scanning side electrode adjacent in the other of two fields to the scanning side electrodes, and
 a modulation voltage is applied for the duration corresponding to the logical value of a plurality of predetermined bits in the term for which the writing voltage of one of the positive voltage and the negative voltage polarities is applied to the scanning electrodes, and a modulation voltage is applied for the duration corresponding to the logical value of a code obtained by inverting the binary code in the term for which the writing voltage of the other of the positive and negative polarities is applied to the scanning electrodes to the data side electrode.

The invention still further provides a driving apparatus for a display device, comprising: a display device formed by interposing a dielectric layer between a plurality of scanning side electrodes and a plurality of data side electrodes, a scanning electrode driving circuit for alternately applying positive writing voltage and negative writing voltage to the scanning electrode adjacent in one field of two fields which form a pair and alternately applying negative writing voltage and positive voltage to the scanning electrode adjacent in the other field to the scanning side electrodes, and data electrode driving circuit for applying a modulation voltage for the duration corresponding to the logical value of a plurality of predetermined bits in the term for which the writing voltage of one of the positive voltage and the negative voltage polarity is applied to the scanning side electrode, and applying a modulation voltage for the duration corresponding to the logical value of a code obtained by inverting the binary code in the term for which the writing voltage of the other of the positive and negative voltage polarity is applied to the scanning side electrode to the data side electrode.

BRIEF DESCRIPTION OF THE DRAWINGS

These and other objects, characteristics, and advantages of the present invention will become more apparent in the detailed description and figures which follow.

FIG. 5 is a timing chart showing a schematic operation of the data conversion circuit 18; and FIG. 6 is a waveform diagram showing the voltage applied to the picture element of the thin-film EL display device.

DETAILED DESCRIPTION OF THE PREFERRED EMBODIMENTS

Preferred embodiments of the invention will now be described in detail with reference to the drawings.

Figure 1:
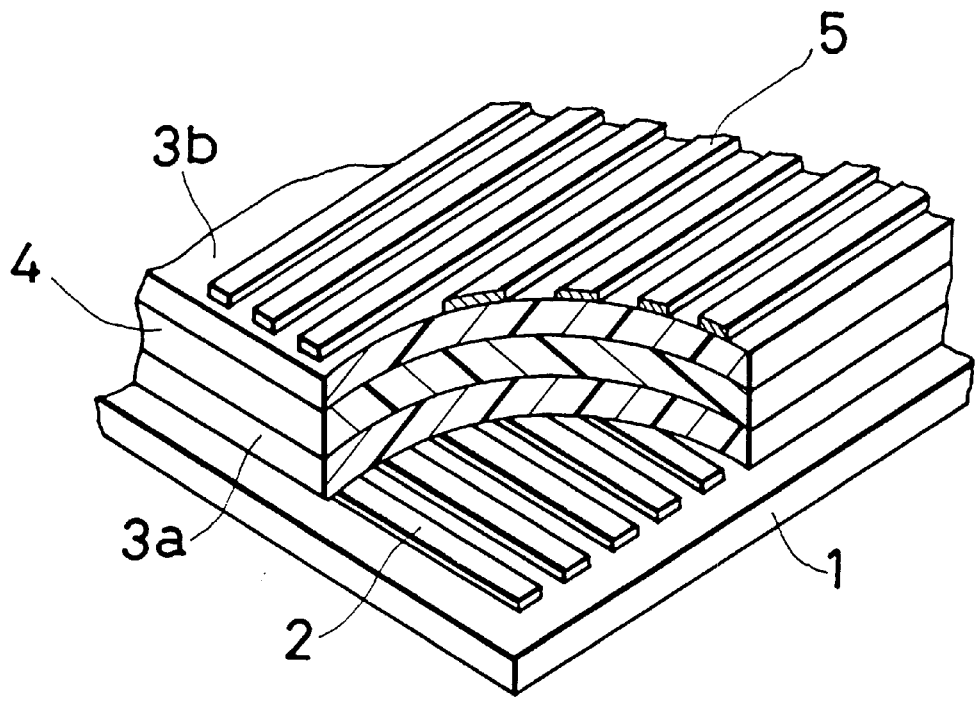
FIG. 1 is a partial cutaway view of a thin-film EL element.
Figure 2:
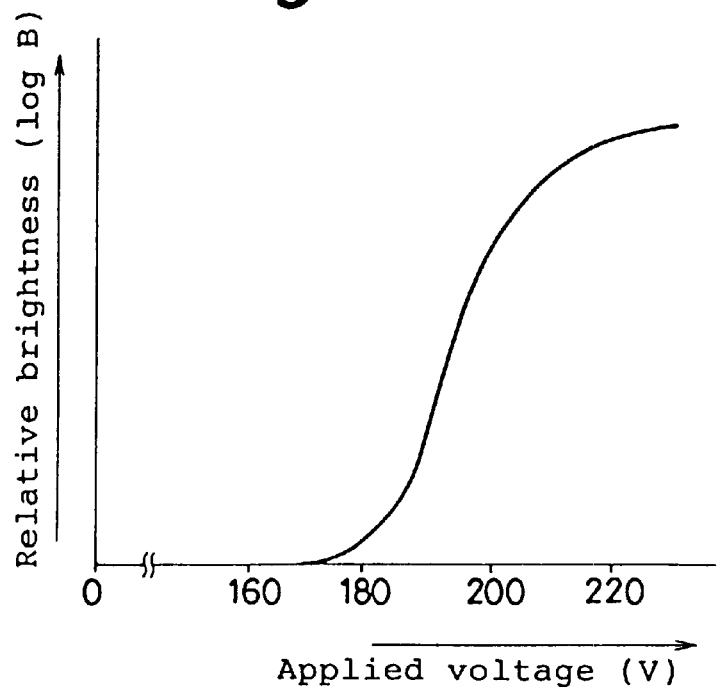
FIG. 2 is a graph showing the voltage - brightness characteristics of the thin-film EL element.
Figure 3:
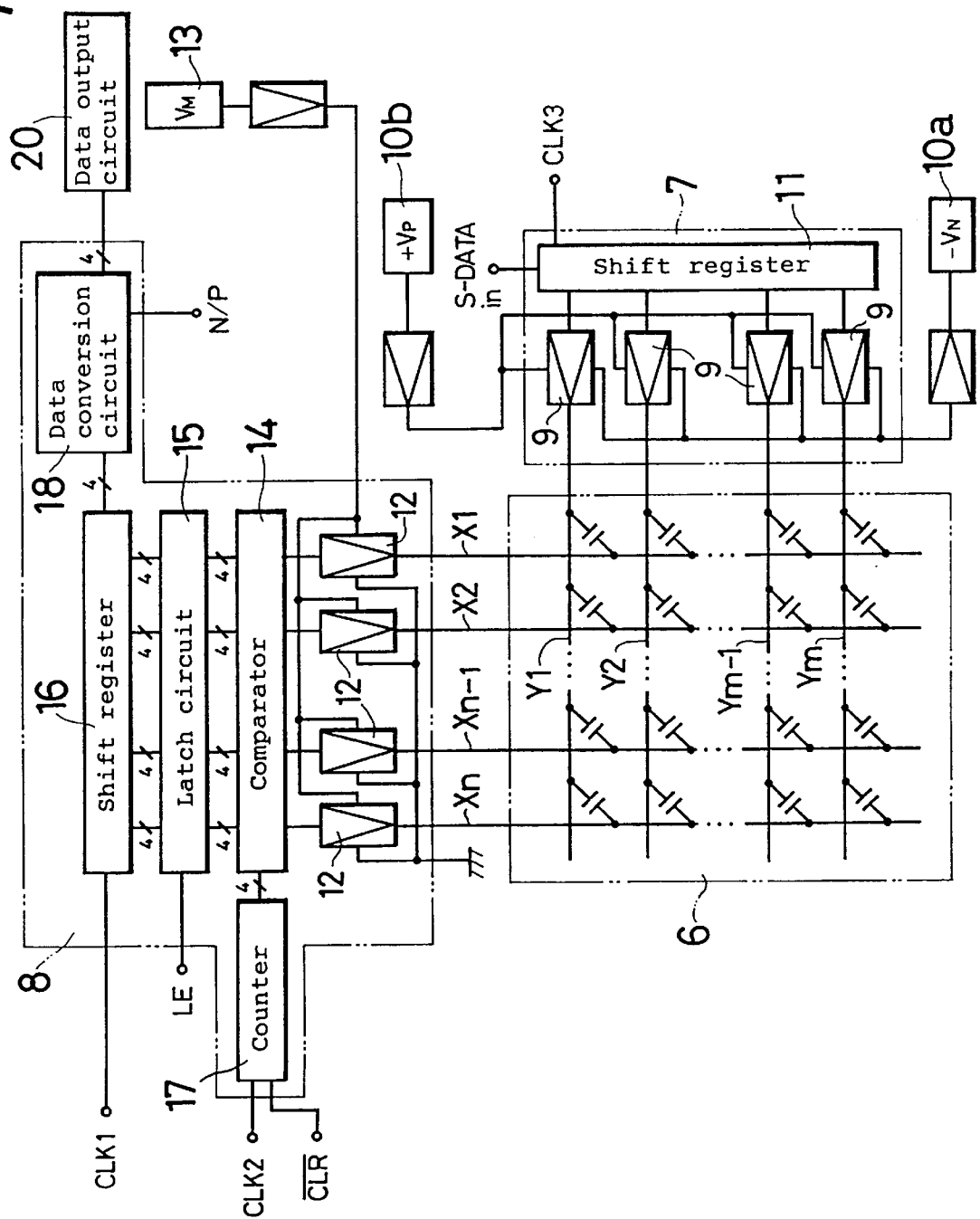
FIG. 3 is a block diagram showing a schematic arrangement of a thin-film EL display device to which a driving method of one embodiment of the invention applies.

FIG. 3 is a block diagram showing a schematic arrangement of a thin-film EL display device to which a driving method of one embodiment of the invention applies. In FIG. 3, a display panel 6 is composed of thin-film EL elements. Its specific arrangement is the same as for the arrangement described for the prior art. So, description thereof is omitted here. A plurality of scanning side electrodes Y1, Y2, - - -, Ym-1, Ym (hereinafter, any of the scanning side electrodes are denoted by the symbol Y) arranged in the display panel 6 are connected to a scanning electrode driving circuit 7. A plurality of data side electrodes X1, X2, - - -, Xm-1, Xm (hereinafter, any of the data side electrodes are denoted by the symbol X) arranged in the direction at right angles to the scanning side electrodes Y1–Ym, are connected to a data side electrode driving circuit 8.

In the scanning electrode driving circuit 7, output ports 9 are each connected to each of scanning side electrodes Y1–Ym. A negative writing voltage $-V_N$ is selectively applied in a first field of negative driving from a power supply 10$a$ via the output port 9. In a second field of positive driving, a positive writing voltage $+V_P$ is selectively applied to each of scanning side electrodes Y1–Ym from another power supply 10$b$ via the output port 9. These output ports 9 are connected to a shift register 11. Scanning data S-DATA for specifying the scanning side electrodes Y1–Ym in a line order is transferred to the shift register 11 in synchronization with a clock CLK3 input from the clock input terminal of the shift register 11, thereby turning on each output port 9 in the line order of the scanning side electrodes Y1–Ym.

On the other hand, in a data electrode driving circuit 8, an output port 12 which is a driving circuit, is connected to each of data side electrodes X1. Further, and the modulation voltage $V_M$ is selectively applied to each of data side electrodes X1–Xn from a power supply 13 via thin output port 12. Depending on the setting condition of the output port 12, each of data side electrodes X1–Xn is clamped to the ground. These output ports 12 are connected to a comparator 14. This comparator 14 is connected to a shift register 16 via a latch circuit 15.

The shift register 16 is a circuit for shifting in synchronization with the clock CLK1 input from its clock input terminal and transferring gradation display data of 4 bits that correspond to the data side electrode X1–Xn. The gradation display data transferred by the shift register 16 is temporarily held in the latch circuit 15 by the latch signal LE, after which it is sent to the comparator 14. The comparator 14 has a function that determines the pulse width of a modulation voltage $V_M$ corresponding to gradation display data by comparing 4-bit parallel data provided from the counter 17 with the similarly 4-bit gradation display data provided from the latch circuit 15.

A data conversion circuit 18 is a circuit for converting gradation display data sent from a data output circuit 20 as a 4-bit binary coded signal according to the negative driving time or positive driving time, and providing the converted gradation display data to the shift register 16. The binary coded signals sent to this circuit 18 as gradation display data are defined as shown in Table 1 in correspondence with brightness levels of 16 steps to be displayed in a picture element. In FIG. 3, each picture element in the display panel 6 is equivalently shown by a capacitor.

TABLE 1

|    | 1 | 2 | 3 | 4 |
|----|---|---|---|---|
| 0  | 0 | 0 | 0 | 0 |
| 1  | 0 | 0 | 0 | 1 |
| 2  | 0 | 0 | 1 | 0 |
| 3  | 0 | 0 | 1 | 1 |
| 4  | 0 | 1 | 0 | 0 |
| 5  | 0 | 1 | 0 | 1 |
| 6  | 0 | 1 | 1 | 0 |
| 7  | 0 | 1 | 1 | 1 |
| 8  | 1 | 0 | 0 | 0 |
| 9  | 1 | 0 | 0 | 1 |
| 10 | 1 | 0 | 1 | 0 |
| 11 | 1 | 0 | 1 | 1 |
| 12 | 1 | 1 | 0 | 0 |

-continued

|    | 1 | 2 | 3 | 4 |
|----|---|---|---|---|
| 13 | 1 | 1 | 0 | 1 |
| 14 | 1 | 1 | 1 | 0 |
| 15 | 1 | 1 | 1 | 1 |

Level Binary Code

Figure 4:
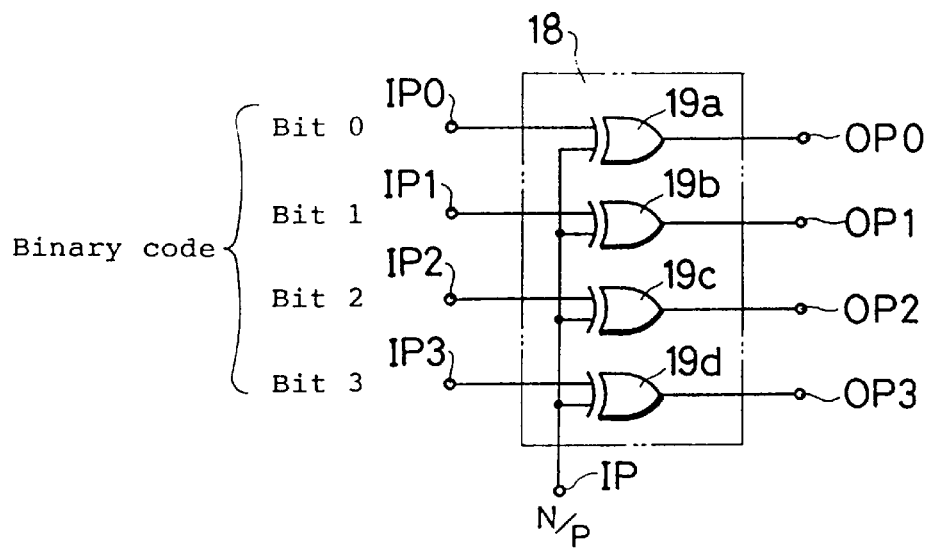
FIG. 4 is a circuit diagram showing a specific arrangement of the data conversion circuit 18.
Figure 4:
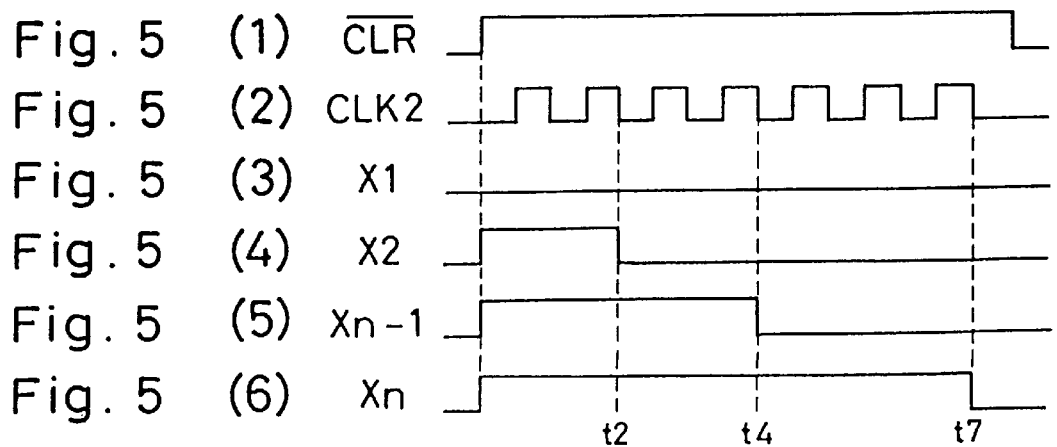

FIG. 4 is a circuit diagram showing a specific arrangement of the data conversion circuit 18. In FIG. 4, input terminals IP0, IP1, IP2, and IP3 are terminals for inputting bits in each place of binary coded signals provided as gradation display data from a data output circuit 20. The input terminals IP0, IP1, IP2, and IP3 are respectively connected to one of the input terminals of a first EX-OR (exclusive logical AND) gate 19a, one of the input terminals of a second EX-OR gate 19b, one of the input terminals of a third EX-OR gate 19c, and one of the input terminals of a fourth EX-OR gate 19d. To the other input terminal of each of EX-OR gates 19a–19d is connected the input terminal IP that accepts the field switching signal N/P that becomes low in the first field of negative driving and becomes high in the second field of positive driving. The output terminals OP0, OP1, OP2 and OP3 of each of EX-OR gates 19a–19d are connected to the shift register 16.

A basic operation of a thin-film EL display device shown in FIG. 3 will now be described with reference to a timing chart shown in FIG. 5.

In the shift register 16 of the data electrode driving circuit 8, converted 4-bit gradation display data sent from the data conversion circuit 18 is transferred in synchronization with the clock CLK1. This gradation display data is temporarily held in the latch circuit 15. Under this condition, when the clear signal CLR, which has been input until that time in the comparator 14 and the counter 17 is released, the data side electrode X corresponding to the data of "0, 0, 0, 0" (=brightness level "0") among the display data held in the latch circuit 15 is clamped to the ground, and the data side electrodes X corresponding to data other than those, are all pulled up to a modulation voltage $V_M$.

Suppose that, for example, gradation display data "0, 0, 0, 0" (=brightness level "0"), "0, 0, 1, 1" (=brightness level "2"), "0, 1, 0, 0" (=brightness level "4") and "0, 1, 1, 1" (=brightness level "7") are provided to output ports 12 corresponding to data side electrodes X1, X2, X3 and X4 of the data electrode driving circuit 8 respectively. At this time, the output ports 12 of the data side electrode X1 are clamped to the ground at the same time the clear signal $\overline{CLR}$ is released, and the modulation voltage $V_M$ from the output ports 12 becomes a waveform as shown in FIG. 5 (3). That is, the pulse width is set to zero.

In the output ports 12 of the data side electrode X2, the count value of the clock CLK2 (see FIG. 5 (2)) counted by the counter 17 is compared with the display data "2" in the comparator 14. It is clamped to the ground at the time t2 when the count value became "2", and the modulation voltage $V_M$ of the pulse width shown in FIG. 5 (4) is set.

Similarly, the output ports 12 of the data side electrode Xn-1 are clamped to the ground at the time t4 when the count value of the counter 16 became "4", and the modulation voltage $V_M$ of the pulse width shown in FIG. 5 (5) is set. For the output ports 12 of the data side electrode Xn, they are clamped to the ground at the time t7 when the count value of the counter 16 becomes "7", and the modulation voltage $V_M$ of the pulse width shown in FIG. 5 (6) is set. Accordingly, the modulation voltage $V_M$ of the pulse width corresponding to gradation display data "0", "2", "4" and "7" is applied to each of data side electrodes X1, X2, Xn-1, and Xn.

On the other hand, in the scanning electrode driving circuit 7, while the clear signal $\overline{CLR}$ is released in the data electrode driving circuit 8, one of all output ports 9 turns on, and a negative writing voltage $-V_M$, or a positive writing voltage $V_p$ is applied to the one scanning side electrode Y that corresponds to the output port. In other words, a writing voltage $-V_M$ is applied in the first field of negative driving, and a writing voltage $+V_p$ is applied in the second field of positive driving.

Repeated operation of the above, in accordance with the line order of the scanning side electrode Y, causes picture elements that lie at each of scanning side electrodes Y to emit light of a brightness according to the gradation display data, or emit no light. As a result, on the whole, a screen having a gradation in brightness is displayed.

In the basic operation described above, the following operation is performed in the data conversion circuit 18 shown in FIG. 4.

That is, suppose that, for example, a binary coded signal "1, 0, 1, 1" equivalent to the brightness level "11" shown in table 1 is input to the data conversion circuit 18. A high-level signal is then input to the input terminals IP0, IP1, and IP3, and a low-level signal is then input to the input terminal IP2. since the field switching signal N/P input to the input terminal IP is low in the first field of negative driving. Data input to the input terminals IP0–IP3 are output as is, to the output terminals OP0–OP3 of each of the EX-OR gates 19a–19d. That is, the gradation display data "1, 0, 1, 1" input to the data conversion circuit 18 is sent to the shift register without any modifications.

In contrast to the above, since the switching signal N/P input to the input terminal IP in the second field of positive driving is at a high level, data such as that of the logical values input to the input terminals IP0–IP3 are inverted, is output to the corresponding output terminals OP0–OP3 of each of EX-OR gates 19a–19d. That is, the gradation display data "1, 0, 1, 1" input to the data conversion circuit 18 is converted to "$\overline{1}, \overline{0}, \overline{1}, \overline{1}$"="0, 1, 0, 0", and sent to the shift register 16. As is apparent from table 1, in this case, the gradation display data equivalent to the brightness level "4" was converted to the gradation display data equivalent to the brightness level "11", and input to the shift register 16.

FIG. 6 shows the waveform of the voltage applied to a corresponding picture element at this time. Of them, FIG. 6 (1) shows a waveform of a modulation voltage $V_M$ applied from the data side electrode X. FIG. 6 (2) shows the waveform of a writing voltage $-V_N$, $+V_p$ applied from the scanning side electrode Y. FIG. 6 (3) shows the waveform of a voltage applied to a picture element.

In this case, in the first field of negative driving, as shown in FIG. 6 (1), a modulation voltage $V_M$ of the pulse width equivalent to the gradation display data "1, 0, 1, 1" (brightness level "11") at the time of input to the data conversion circuit 18 is set. Since the writing voltage at this time is a negative voltage $-V_M$ as shown in FIG. 6 (2), the section corresponding to the pulse width of the modulation voltage $V_M$ becomes the section in which the writing voltage exceeds the light emission threshold voltage Vth. Thus, the brightness level "11" corresponding to the pulse width of the modulation voltage $V_M$ is displayed as is.

On the other hand, in the second field of positive driving, as shown in FIG. 6 (1), a modulation voltage $V_M$ of the pulse width equivalent to the gradation display data "0, 1, 0, 0" (brightness level "4") obtained by inverting the logical value of the gradation display data "1, 0, 1, 1" (brightness level "11") at the time of input to the data conversion circuit 18, is set. Since the writing voltage at this time is a positive voltage $+V_p$ as shown in FIG. 6 (2), in the waveform of the voltage shown in FIG. 6 (3), a voltage of a section in which the pulse width of the writing voltage $V_p$ is subtracted by the pulse width of the modulation voltage $V_M$, i.e., the section equivalent to the pulse width of the modulation voltage $V_M$ in negative driving exceeds the light emission threshold voltage Vth. In this case, also, a brightness level "11" is displayed. That is, in both the negative driving and positive driving, a common brightness level corresponding to the gradation display data input to the data conversion circuit 18 is displayed.

In the above operation, the case where gradation display data "1, 0, 1, 1" of a brightness level "11" is inverted to gradation display data "0, 1, 0, 0" of a brightness level "4" is described. The same relation of inversion correspondence holds for the other gradation display data. In table 1, for example, a relation of inversion correspondence holds between gradation display data "1, 1, 1, 1" of brightness level "15" and gradation display data "0, 0, 0, 0" of brightness level "0", between gradation display data "1, 1, 1, 0" of brightness level "14" and gradation display data "0, 0, 0, 1" of brightness level "1", and between gradation display data "1, 0, 0, 0" of brightness level "8" and gradation display data "0, 1, 1, 1" of brightness level "7".

In this embodiment, a case in which the data conversion circuit 18 is incorporated in the data electrode driving circuit 8 is shown. However, the data circuit 18 may be arranged separately from the data electrode driving circuit 8.

The scanning electrodes Y may be applied with voltages in such a way that, for example, a positive writing voltage $+V_p$ is applied to the odd-numbered scanning electrodes Y1, Y3 - - - in one of the fields (first field), and a negative writing voltage $+V_N$ is applied to the even-numbered scanning electrodes Y2, Y4 - - - . In the other field (second field), a negative writing voltage $-V_N$ is applied to the odd-numbered scanning electrodes Y1, Y3 - - - , and a positive writing voltage $+V_p$ is applied to the even-numbered scanning electrodes Y2, Y4 - - - .

In this embodiment, a case in which gradation display is performed by a pulse width modulation method, is described. However, it also applies to the case where gradation display is performed by an amplitude modulation method, in addition to the above method.

Furthermore, it also applies to other capacitive display devices such as a liquid crystal display device, etc. driven by ac in the same way as for the thin-film EL display device of the above embodiment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A symmetrical drive method for driving a display device formed by interposing a dielectric layer between a plurality of scanning side electrodes and a plurality of data side electrodes whose intersections form a plurality of pixels, the symmetrical drive method comprising the steps of:

applying a positive writing voltage in one of a pair of fields, and applying a negative writing voltage in the other of the pair of fields, to each of the plurality of scanning side electrodes;

applying a first modulated voltage, to said plurality of pixels, with a time duration corresponding to a logical value of a binary code of a plurality of predetermined bits in said one of the pair of fields; and inverting the logical value of the binary code of the plurality of predetermined bits to produce the binary complement of the logical value of the binary code of the plurality of predetermined bits and applying the binary complement as a second modulated voltage, to said plurality of pixels, in the other of the pair of fields, thereby providing a symmetrical voltage waveform to said plurality of pixels.

2. A symmetrical drive method for driving a display device including a dielectric layer disposed between a plurality of scanning side electrodes and a plurality of data side electrodes arranged in intersecting directions to each other, the symmetrical drive method comprising the steps of:

applying a modulation voltage, according to gradation display data, to each of the plurality of data side electrodes;

applying one of a positive and negative writing voltage, in a line sequential order, to each of the plurality of scanning side electrodes;

displaying different levels of brightness on picture elements, made of the dielectric layer and formed at each scan and data electrode intersection, to perform a gradation display of different brightness in several steps;

utilizing binary coded signals corresponding to each gradation of a different level of brightness for the gradation display, as the gradation display data; and inverting the binary coded signals so that gradation display data and its binary complement are utilized with the positive and negative writing voltage, respectively, to provide a symmetrical voltage waveform to the picture elements.

3. A symmetrical driving apparatus for driving a display device formed with a dielectric layer interposed between a plurality of scanning side electrodes and a plurality of data side electrodes, whose intersections form a plurality of pixels, the symmetrical driving apparatus comprising:

a scanning electrode driving circuit, for applying a positive writing voltage in one of a pair of fields, and a negative writing voltage in another of the pair of fields, to each of the scanning side electrodes; and a data electrode driving circuit, for applying a first modulated voltage with a time duration corresponding to a logical value of a binary code corresponding to display data, of a plurality of predetermined bits, in said one of the pair of fields, to each of the data side electrodes, inverting the logical value of the binary code of the plurality of predetermined bits to produce the binary complement of the logical value of the binary code of predetermined bits, and for applying the binary complement as a second modulated voltage in the other of the pair of fields, to each of the data side electrodes, thereby providing a symmetrical voltage waveform to said plurality of pixels.

4. The symmetrical driving apparatus of claim 3, wherein the data electrode driving circuit comprises:

a data conversion circuit for outputting a binary coded data representing a gradation of data to be displayed in one of the pair of fields, and for inverting and outputting the binary coded data representing an inverted gradation of data to be displayed in another of the pair of fields, a counter for performing a pulse counting operation for each of the scanning side electrodes, a comparator for comparing the binary coded data representing the gradation of data to be displayed with the counted value of the counter, and for determining a time duration of a modulation voltage to be applied, and a driving circuit for forming a modulation voltage waveform in response to the determination of the comparator and for providing the modulation voltage waveform to drive the data side electrodes.

5. The symmetrical driving apparatus of claim 4, wherein the driving circuit superimposes the modulation voltage waveform on a predetermined display threshold voltage, said predetermined display threshold voltage being within a range of gradation changes depending upon a necessary voltage to light said plurality of pixels being 100% or 0%, and provides the superimposed voltage to the data side electrodes.

6. A symmetrical driving method for driving a display device formed by interposing a dielectric layer between a plurality of scanning side electrodes and a plurality of data side electrodes whose intersections form a plurality of pixels, the symmetrical driving method comprising the steps of:

applying a positive writing voltage and a negative writing voltage, alternately, to adjacent scanning side electrode pairs, in one field;

applying a first modulated voltage to said plurality of pixels with a time duration corresponding to a logical value of a binary code of a plurality of predetermined bits corresponding to data to be displayed in a term corresponding to one electrode of the adjacent scanning side electrode pair; and inverting the logical value of the binary code of the plurality of predetermined bits to produce the binary complement of the logical value of the binary code of the plurality of predetermined bits and applying the binary complement as a second modulated voltage to said plurality of pixels in a term corresponding to the other electrode of the adjacent scanning side electrode pair, to the data side electrodes, thereby providing a symmetrical voltage waveform to said plurality of pixels.

7. A symmetrical driving apparatus for a display device formed by interposing a dielectric layer between a plurality of scanning side electrodes and a plurality of data side electrodes whose intersections from a plurality of pixels, the symmetrical driving apparatus comprising:

a scanning electrode driving circuit for applying a positive writing voltage and a negative writing voltage, alternately, to each of adjacent scanning side electrode pairs, in one field; and a data electrode driving circuit for applying a first modulated voltage with a time duration corresponding to a logical value of a binary code of a plurality of predetermined bits corresponding to data to be displayed, in a term corresponding to one electrode of the adjacent scanning side electrode pairs, inverting the logical value of the binary code of the plurality of predetermined bits to produce the binary complement of the logical value of the binary code of predetermined bits, and for applying the binary complement as a second modulated voltage in a term corresponding to the other electrode of the adjacent scanning side electrode pairs, to the data side electrodes.

8. A symmetrical driving method for driving a display device formed by interposing a dielectric layer between a plurality of scanning side electrodes and a plurality of data side electrodes whose intersections form a plurality of pixels, the symmetrical driving method comprising the steps of:

applying a positive writing voltage and negative writing voltage, alternately, to adjacent scanning side electrodes which form a pair, in one of two fields, and applying a negative writing voltage and positive writing voltage, alternately, to adjacent scanning side electrodes in the other of the two fields;

applying a first modulated voltage to said plurality of pixels with a time duration corresponding to a logical value of a plurality of predetermined bits corresponding to data to be displayed in a term for which one of the positive writing voltage and the negative writing voltages is applied to the scanning side electrodes, to the data side electrodes;

inverting the logical value of the binary code of the plurality of predetermined bits to produce the binary complement of the logical value of the binary code of the plurality of predetermined bits and applying the binary complement as a second modulated voltage to said plurality of pixels in a term for which the other of the positive and the negative writing voltages is applied to the scanning side electrodes, to the data side electrodes, thereby providing a symmetrical voltage waveform to said plurality of pixels.

9. A symmetrical driving apparatus for a display device, the display device being formed by interposing a dielectric layer between a plurality of scanning side electrodes and a plurality of data side electrodes whose intersections form a plurality of pixels, the symmetrical driving apparatus comprising:

a scanning electrode driving circuit for applying a positive writing voltage and negative writing voltage, alternately, to a first scanning electrode of a pair of adjacent electrodes, in one field of two fields which form a pair and for applying another negative writing voltage and positive writing voltage, alternately, to the other scanning side electrode of the pair in another of the two fields; and data electrode driving circuit for applying a first modulated voltage, with a time duration corresponding to a logical value of a binary code of a plurality of predetermined bits corresponding to data to be displayed, in a term for which the positive writing voltage are and negative writing voltage are applied to the scanning side electrodes, to the data side electrodes, inverting the logical value of the binary code of the plurality of predetermined bits to produce the binary complement of the logical value of the binary code of predetermined bits and for applying the binary complement as a second modulated voltage, in a term for which the another of the negative writing voltage and positive writing voltage are applied to the scanning side electrodes, to the data side electrodes, thereby providing a symmetrical voltage waveform to said plurality of pixels.

* * * * *